United States Patent [19]
Kube et al.

[11] Patent Number: 6,159,074
[45] Date of Patent: Dec. 12, 2000

[54] CALIPER ASSEMBLY FOR A GRINDING MACHINE

[76] Inventors: Samuel C. Kube, RD #1, Box 191, Templeton, Pa. 16259; Albert A. Plekker, 158 Portland Dr., Natrona Heights, Pa. 15065

[21] Appl. No.: 09/226,287

[22] Filed: Jan. 7, 1999

[51] Int. Cl.[7] .................................................. B24B 5/00
[52] U.S. Cl. ............................. 451/8; 451/49; 451/142; 33/555; 33/549
[58] Field of Search .................... 451/142, 49, 5, 451/8, 10; 33/549, 550, 555, 555.1, 783, 784

[56] References Cited

U.S. PATENT DOCUMENTS

| | | | |
|---|---|---|---|
| 3,603,044 | 9/1971 | Price | 51/165.91 |
| 3,653,162 | 4/1972 | Clark, Jr. | 51/165 TP |
| 3,962,792 | 6/1976 | Stepanek et al. | 33/143 |
| 4,204,798 | 5/1980 | Warren et al. | 414/750 |
| 4,807,400 | 2/1989 | Corallo et al. | 51/165 R |
| 4,811,524 | 3/1989 | Corallo | 51/165 R |
| 4,949,468 | 8/1990 | Kohler | 33/555.1 |
| 4,958,442 | 9/1990 | Eckhardt | 33/703 |
| 5,092,056 | 3/1992 | Deaton | 33/544 |
| 5,203,615 | 4/1993 | Zanetis et al. | 299/39 |
| 5,562,525 | 10/1996 | Mori et al. | 451/5 |
| 5,631,413 | 5/1997 | Young et al. | 73/151.29 |
| 5,853,318 | 12/1998 | Thom et al. | 451/425 |

*Primary Examiner*—Joseph J. Hail, III
*Assistant Examiner*—William Hong
*Attorney, Agent, or Firm*—Webb Ziesenheim Logsdon Orkin & Hanson, P.C.

[57] ABSTRACT

Disclosed is a caliper assembly for measuring a diameter of a roll received on a roll support of a grinding machine which includes a frame positionable adjacent the roll support and a linear guide connected to the frame. A pair of measuring arms is connected in spaced relation to the linear guide. The linear guide is configured to enable each measuring arm to move relative to the frame and parallel to the longitudinal axis of the linear guide. A linear motor is connected between the frame and the pair of measuring arms. The linear motor is configured to supply to the pair of measuring arms a motive force which causes the pair of measuring arms to move together or apart. If one of the measuring arms contacts a workpiece with a force in excess of a predetermined force, the linear motor terminates supplying motive force thereto.

19 Claims, 4 Drawing Sheets

CALIPER ASSEMBLY FOR A GRINDING MACHINE

BACKGROUND OF THE INVENTION

1. Field of the Invention

This invention relates generally to the field of roll or cylinder grinding machines and, more particularly, to calipers utilized to measure the diameter of rolls or cylinders received on roll grinding machines.

2. Description of the Prior Art

Metal rolls are commonly used in both the steel and aluminum industries for rolling and shaping a metal piece. After continued use, these rolls become pocked and pitted and therefore must be replaced. Rather than being discarded, the used rolls can be ground on a grinding machine to refinish the roll surface so that the rolls can be reused. Various types of grinding machines are known for grinding cylindrical objects, such as rolling mill work rolls and back-up rolls, to refinish or smooth the rolls. These known devices are generally of two types. In the first type, known as a traveling carriage machine, the roll is rotated in a stationary position and a rotating grinding wheel is moved laterally along the roll to grind the roll to a desired diameter. In the second type, known as a traveling table machine, the rotating grinding wheel is stationary and the spinning roll is passed along the grinding wheel.

The grinding operation is typically a multiple pass operation in which the roll or the grinding wheel moves back and forth for several passes until a desired roll diameter or shape is obtained. As the roll is ground, the diameter or shape of the roll is measured so that the grinding operation can be controlled. In older grinding machines, the roll diameter or shape is measured manually. However, this means that the grinding operation is stopped while the roll is measured. In more recent grinding machines, an automated measurement device, such as a caliper, is mounted on the machine and is used to monitor the roll diameter or shape during grinding.

An example of a known traveling carriage grinding machine is described in U.S. Pat. No. 4,811,524 to Corallo, which is incorporated herein by reference. This known device includes a front bed having a pair of spaced-apart steady rests designed to support the roll to be ground. Rotating devices for rotating the roll are located at the ends of the front bed. A rear bed is located adjacent the front bed. A grinding carriage is moveably mounted on the rear bed and contains a rotatable grinding wheel. The grinding carriage moves back and forth along the rear bed to grind the surface of the roll. A caliper having extended measuring arms which contact the roll is utilized to measure the "after grind" diameter or shape of the roll. The caliper is typically mounted on a measurement carriage moveable along a separate track attached to the front bed. The measurement carriage is moveable independent of the grinding carriage and, therefore, must be controlled independently of the grinding carriage. In a traveling table grinding machine, the grinding carriage would be fixedly mounted on the rear bed while the front bed would be longitudinally moveable to pass the roll back and forth along the grinding wheel. The structure and operation of such known traveling carriages and traveling table grinding devices are readily understood by those of ordinary skill in the art.

A problem with calipers utilized with these known devices is that the measuring arms are mechanically coupled to a motor which is utilized to move the measuring arms toward or away from the roll. When one or more of the measuring arms contacts the roll it is possible, with the mechanical coupling between the measuring arms and the motor, to apply to the measuring arms an excessive force which damages the measuring arms and/or the mechanical coupling between one or both of the measuring arms and the motor.

It is an object of the present invention to overcome the above problems and others by providing a caliper that avoids damaging a measuring arm of the caliper. Still other objects will become apparent to those of ordinary skill in the art upon reading and understanding the following detailed description.

SUMMARY OF THE INVENTION

Accordingly, we have invented a grinding machine for grinding a roll. The grinding machine includes a roll support configured to receive a roll so that the roll is rotatable around its longitudinal axis and a grinding wheel having a grinding surface around the circumference thereof. The grinding surface is positionable in contact with the roll received on the roll support. The grinding wheel or the roll support is moveable relative to the other of the grinding wheel or the roll support so that the grinding surface is moveable between opposite ends of the roll. A caliper configured to measure a diameter of the roll is positionable adjacent the roll support. The caliper or the roll support is moveable relative to the other of the caliper or the roll support so that the caliper can measure the diameter of the body of the roll between the opposite ends thereof. The caliper includes a frame and linear guide connected to the frame. A pair of measuring arms is connected to the linear guide in spaced relation. The linear guide is configured to enable each measuring arm to move relative to the frame and parallel to the longitudinal axis of the linear guide. A linear motor is connected between the frame and the pair of measuring arms. The linear motor is configured to supply to the pair of measuring arms a motive force which causes the pair of measuring arms to move parallel to the longitudinal axis of the linear guide. The linear motor is configured to terminate the supply of motive force to at least one of the measuring arms in response to at least one measuring arm contacting the roll with a force in excess of a predetermined force.

Preferably, the linear motor includes an elongated stator connected to the frame and a armature connected to at least one of the measuring arms. The stator has a longitudinal axis positioned parallel to the longitudinal axis of the linear guide. The armature is positioned adjacent the elongated stator and in spaced relation thereto. At least one of the elongated stator and the armature are electrically excitable to develop therebetween the motive force.

The caliper can include a pair of cables and a pair of cable pulleys connected to the frame adjacent opposite ends of the linear guide. One cable is connected between the pair of measuring arms via one of the cable pulleys and the other cable is connected between the pair of measuring arms via the other cable pulley. A linear encoder can be connected between the frame and at least a first of the measuring arms. The linear encoder can be configured to generate a signal indicative of the position of the first of the measuring arms on the frame. The linear encoder can include an elongated scale connected to the frame and a scanning head connected to the first of the measuring arms in spaced relation to the elongated scale. The longitudinal axis of the elongated scale is positioned parallel to the longitudinal axis of the linear guide. The scanning head moves adjacent the elongated scale and generates the signal indicative of the position of the first of the measuring arms on the frame in response to movement of the first of the measuring arms relative to the frame.

Preferably, each measuring arm includes a base connected between the linear motor and the linear guide and a shaft pivotally connected to the base transverse to the longitudinal axis of the linear guide. A length gauge can be connected between the base and the shaft. The length gauge can be configured to generate a signal indicative of pivoting of the shaft relative to the base. Preferably, the shaft is pivotally connected to the base intermediate the ends of the shaft and the length gauge is connected to the shaft adjacent one end thereof.

The grinding machine can also include a controller connected to receive and combine the signals from the linear encoder and the length gauges to obtain an indication of the distance between the shafts. The controller can also be connected to and electrically excite at least one of the elongated stator and the armature to develop the motive force therebetween.

We have also invented a caliper assembly for measuring a diameter of a roll received on a roll support of a grinding machine which includes a grinding wheel for grinding the roll. The caliper assembly includes a frame positioned adjacent the roll support and a linear guide connected to the frame. The longitudinal axis of the linear guide is positioned perpendicular and in spaced relation to the longitudinal axis of the roll received on the roll support. A linear motor is connected to the frame and the longitudinal axis of the linear motor is positioned parallel to the longitudinal axis of the linear guide. A first measuring arm is connected between the linear guide and the linear motor. The longitudinal axis of the measuring arm extends orthogonal to the longitudinal axis of the roll and the longitudinal axis of the linear guide. The linear guide enables the measuring arm to move parallel to the longitudinal axis of the linear guide. The linear motor supplies to the measuring arm a motive force which causes the measuring arm to move parallel to the longitudinal axis of the linear guide and into contact with the roll received at the roll support. In response to the measuring arm contacting the roll and linear motor supplying to the measuring arm a motive force in excess of a predetermined force, the linear motor terminates supplying the motive force thereto.

The caliper assembly can include a second measuring arm connected to the linear guide. A first cable can be connected between the measuring arms via a first cable pulley positioned adjacent one end of the linear guide and a second cable can be connected between the measuring arms via a second cable pulley positioned adjacent the other end of the linear guide. The cables, the cable pulleys and the measuring arms coact so that the linear motor supplying a motive force to the first measuring arm causes the first and second measuring arms to synchronously move together or apart.

Lastly, we have invented a caliper assembly for measuring a workpiece. The caliper assembly includes a frame, a measuring arm, a linear motor connected between the frame and the measuring arm adjacent one end thereof and a linear guide connected between the frame and the measuring arm adjacent one end thereof. In response to excitation thereof, the linear motor generates a motive force which moves the measuring arm along the linear guide whereby the other end of the measuring arm moves one of toward and away from the workpiece. In response to moving the measuring arm adjacent the other end thereof into contact with the workpiece with a force in excess of a predetermined force, the linear motor terminates generating the motive force.

DETAILED DESCRIPTION OF THE PREFERRED EMBODIMENT

Figure 1:
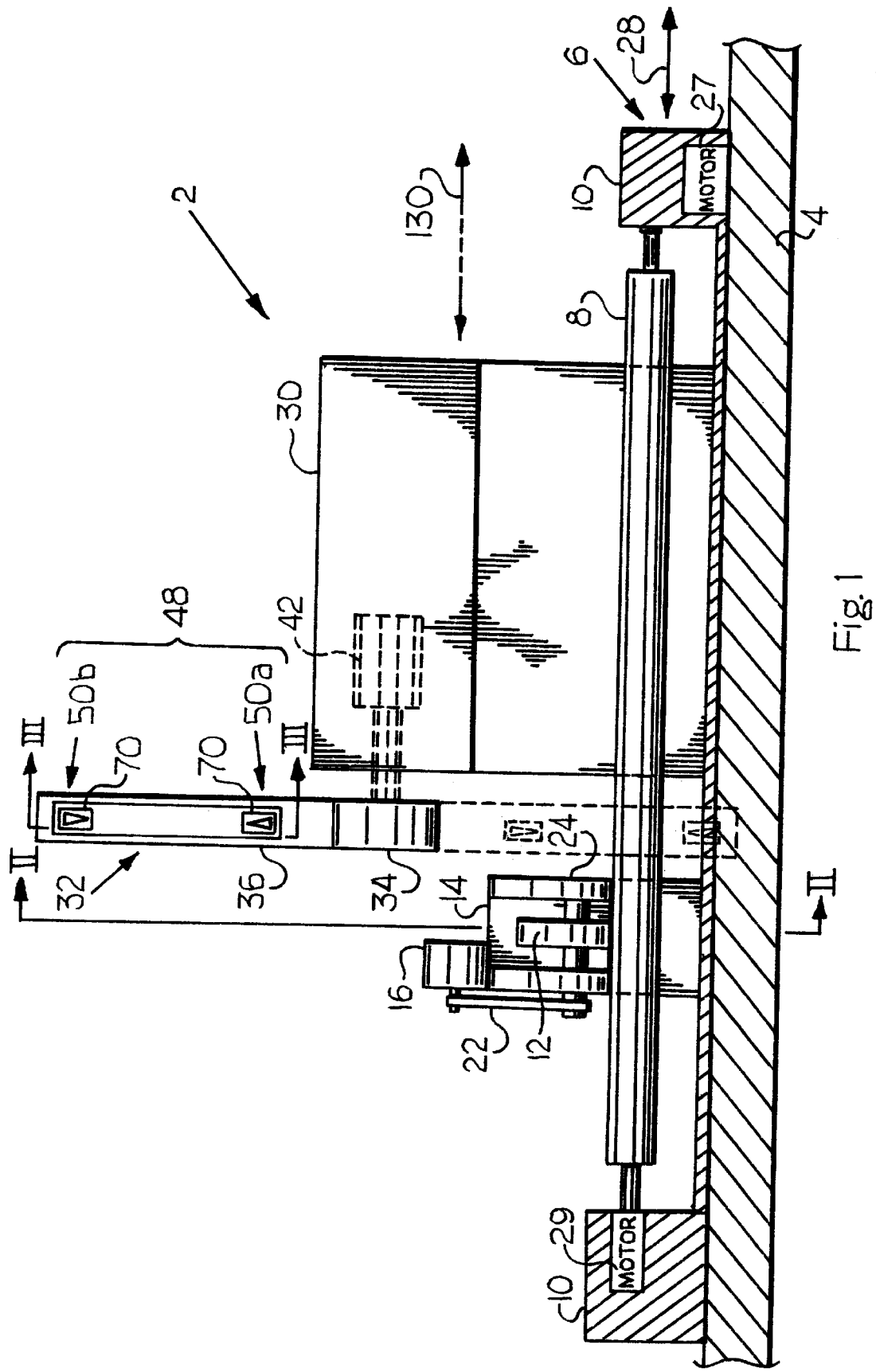
FIG. 1 is a side view of a grinding machine including a caliper assembly in accordance with the present invention.
Figure 2:
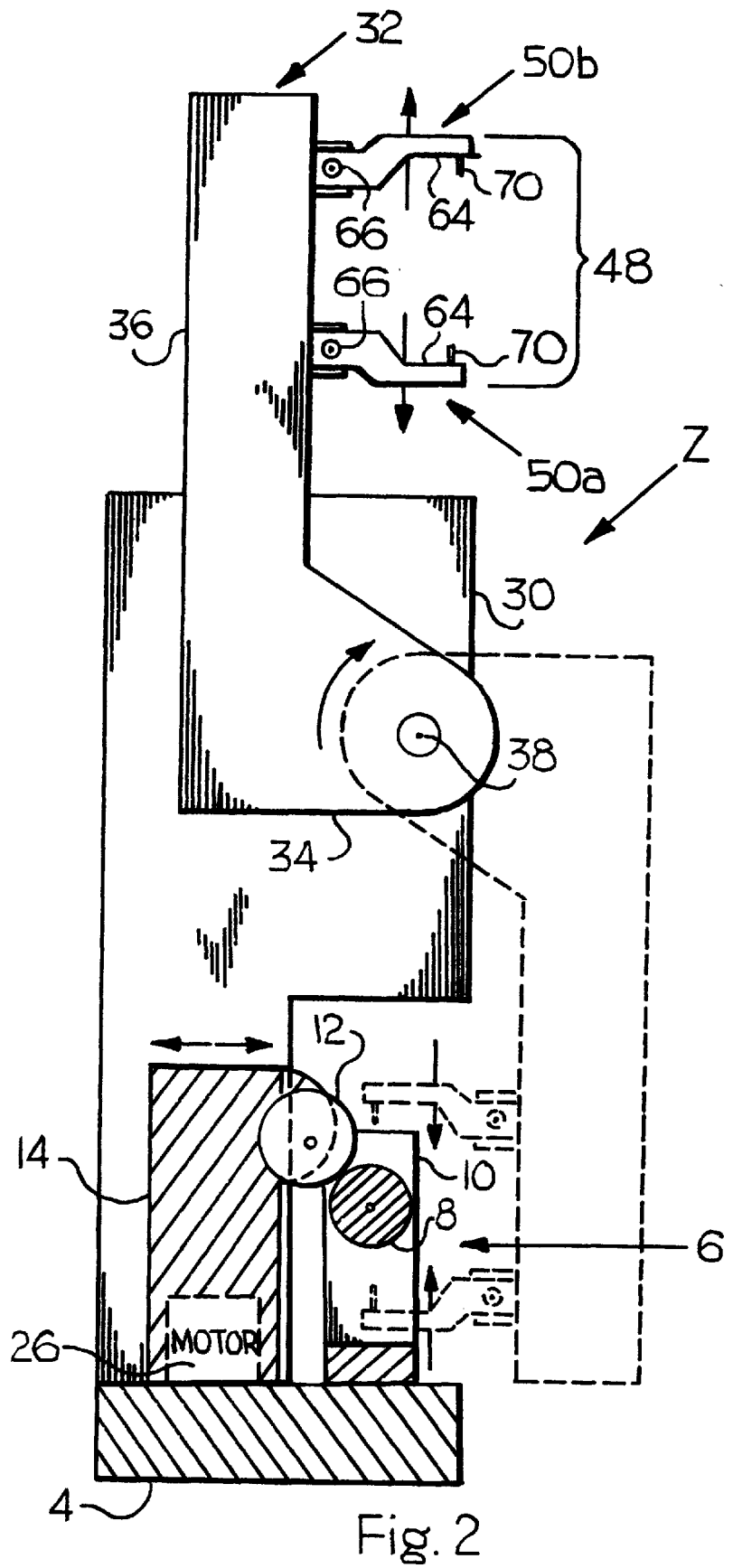
FIG. 2 is a section taken along the line II—II of FIG. 1.

With reference to FIGS. 1 and 2, a grinding machine 2 includes an elongated base 4 and an elongated roll support 6 positioned on the base 4. The roll support 6 is configured to receive a roll 8 between a pair of opposed rests 10. A grinding wheel 12 is rotatably mounted on a grinding wheel frame 14 which is moveably coupled to the base 4. Motor 16 is coupled to the grinding wheel frame 14 by a flexible continuous belt 22 for rotating the grinding wheel 12 around its rotation axis.

Motor 26, shown in phantom in FIG. 2, is coupled to the grinding wheel frame 14 for moving the grinding wheel frame 14 between opposite sides of the base 4. The grinding wheel frame 14 is positioned on the base 4 so that moving the grinding wheel frame 14 toward the roll support 6 side of the base 4 moves a grinding surface 24 of the grinding wheel 12 into contact with the roll 8. Similarly, moving the grinding wheel frame 14 toward a side of the base 4 opposite the roll support 6 moves the grinding surface 24 of the grinding wheel 12 away from the roll 8.

To enable the grinding surface 24 of the grinding wheel 12 to contact the entire surface of the roll 8, the roll support 6 is moveable relative to the grinding wheel 12, and vice versa. In the embodiment shown in FIGS. 1 and 2, the grinding wheel 12 is stationary and the roll support 6 is moveable back and forth on the base 4 in a direction parallel to the longitudinal axis of the roll 8. Motor 27, shown in phantom in FIG. 1, is coupled to the roll support 6 for moving the roll support 6 back and forth on the base 4, in the direction shown by the two-headed arrow 28 in FIG. 1, so that the body of the roll 8 can be ground by the grinding surface 24 of the grinding wheel 12. Motor 29, shown in phantom in FIG. 1, is coupled to the roll 8 for rotating the roll 8 around its longitudinal axis.

The grinding machine 2 includes a frame or housing 30 connected to the base 4 and an L-shaped caliper arm 32 connected to the frame 30. The L-shaped caliper arm 32 has a base 34 and a leg 36. The side of the base 34 opposite the leg 36 has a pivot axis 38 pivotally connected to the frame 30 in spaced parallel relation to the longitudinal axis of the roll 8 received on the roll support 6. The caliper arm 32 is coupled to a motor 42, shown in phantom in FIG. 1, which rotates the caliper arm 32 around its pivot axis 38 between a position remote from the roll support 6, as shown in FIGS. 1 and 2, and a position adjacent the roll support 6, as shown in phantom in FIGS. 1 and 2.

The caliper arm 32 includes a caliper 48 which has a pair of measuring arms 50A and 50B positioned in spaced relation along the length of the leg 36. Preferably, each measuring arm 50 extends laterally from the leg 36 toward the base 34 side of the caliper arm 32. Preferably, measuring arms 50A and 50B are controlled to move synchronously together or apart along the length of the leg 36. However, the caliper 48 can be configured so that measuring arms 50A and 50B move independently.

Figure 3:
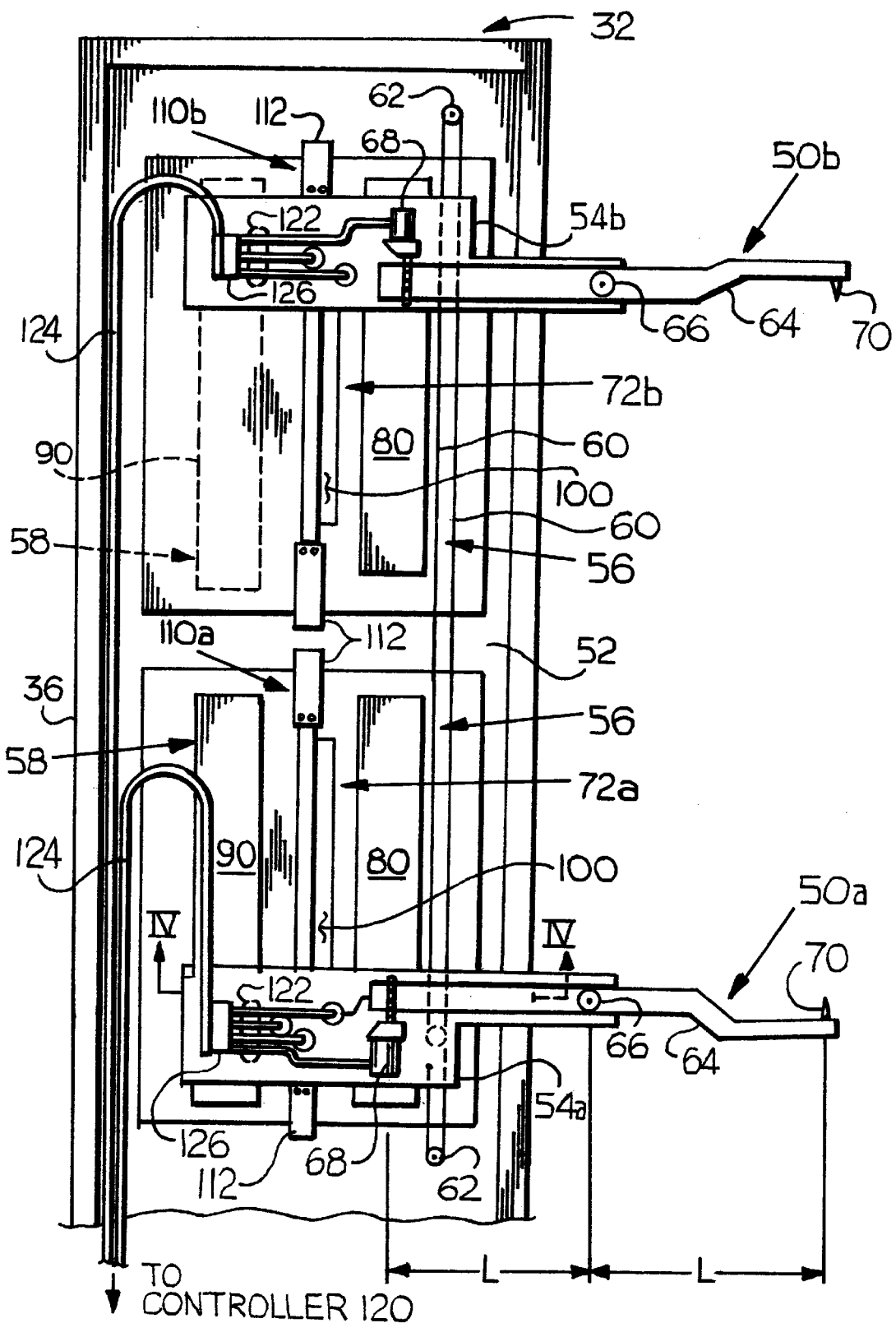
FIG. 3 is a section taken along the line III—III of FIG. 1.

With particular reference to FIG. 3, and with continuing reference to FIGS. 1 and 2, the leg 36 of the caliper arm 32 includes a frame or housing 52. Measuring arms 50A and 50B include bases 54A and 54B, respectively, which are moveably coupled to the frame 52 via an elongated linear guide 56 connected between the frame 52 and the bases 54A and 54B. An elongated linear motor 58 is connected between the frame 52 and the base 54A of measuring arms 50A. However, the elongated linear motor 58 can be connected between the frame 52 and the base 54B of measuring arm 50B, as shown in phantom in FIG. 3. The linear motor 58 is configured to move the base 54A of measuring arm 50A along the longitudinal axis of the linear guide 56 which is preferably positioned parallel to the longitudinal axis of the leg 36.

The bases 54A and 54B of the measuring arms 50A and 50B are coupled together via cables 60 and cable pulleys 62 which enable a motive force supplied by the linear motor 58 to base 54A of measuring arm 50A to be coupled to base 54B of measuring arm SOB. More specifically, the cable pulleys 62 are connected to the frame 52 on opposite ends of the linear guide 56. One of the cables 60 is connected between the bases 54A and 54B via one of the cable pulleys 62 and the other cable 60 is connected between the bases 54A and 54B via the other cable pulley 62. Preferably, the cables 60 extend between the cable pulleys 62 and the bases 54A and 54B of the measuring arms 50 parallel to the longitudinal axis of the linear guide 56.

The cables 60, the cable pulleys 62 and the bases 54A and 54B of measuring arms 50A and 50B coact so that the bases 54A and 54B move together or apart in synchronization. For example, operating the linear motor 58 to move the base 54A of measuring arm 50A toward or away from the center of the leg 36 causes the base 54B of measuring arm 50B to move toward or away, respectively, from the center of the leg 36.

Each measuring arm 50 includes a shaft or arm 64 pivotally connected to the base 54 via a pivot bearing 66. Preferably, each pivot bearing 66 is connected to its respective base 54 adjacent the base 34 side of the caliper arm 32 and each shaft 64 is connected to the respective pivot bearing 66 intermediate the ends of the shaft 64. Each shaft 64 is positioned so that it extends transverse, preferably laterally, from the leg 36 toward the base 34 side of the caliper arm 32. Each measuring arm 50 includes a length gauge 68 connected between the base 54 and an end of the shaft 64 adjacent the linear guide 56. Connected in opposition on the ends of the shafts 64 opposite the length gauges 68 are probe tips 70. An end of each probe tip 70 opposite its corresponding shaft 64 is preferably a knife edge.

Each length gauge 68 is configured to generate a signal indicative of pivoting of the shaft 64 connected thereto relative to the base 54. Preferably, the probe tip 70 and the length gauge 68 of each shaft 64 are connected a distance L from the pivot bearing 66. Hence, pivoting of the shaft 64 in response to the probe tip 70 abutting a workpiece, such as the roll 8, causes the length gauge 68 to generate a signal directly indicative of such pivoting. Alternatively, the probe tip 70 and the length gauge 68 can be connected to the shaft 64 at different distances from the pivot bearing 66. In this embodiment, however, the signal generated by the length gauge 68 must be adjusted by a ratio of such distances in order to obtain an accurate indication of the rotation of the shaft 64.

Connected between the frame 52 and bases 54A and 54B are linear encoders 72A and 72B. Each linear encoder 72 is configured to generate a signal indicative of the position of its corresponding base 54 on the frame 52.

Figure 4:
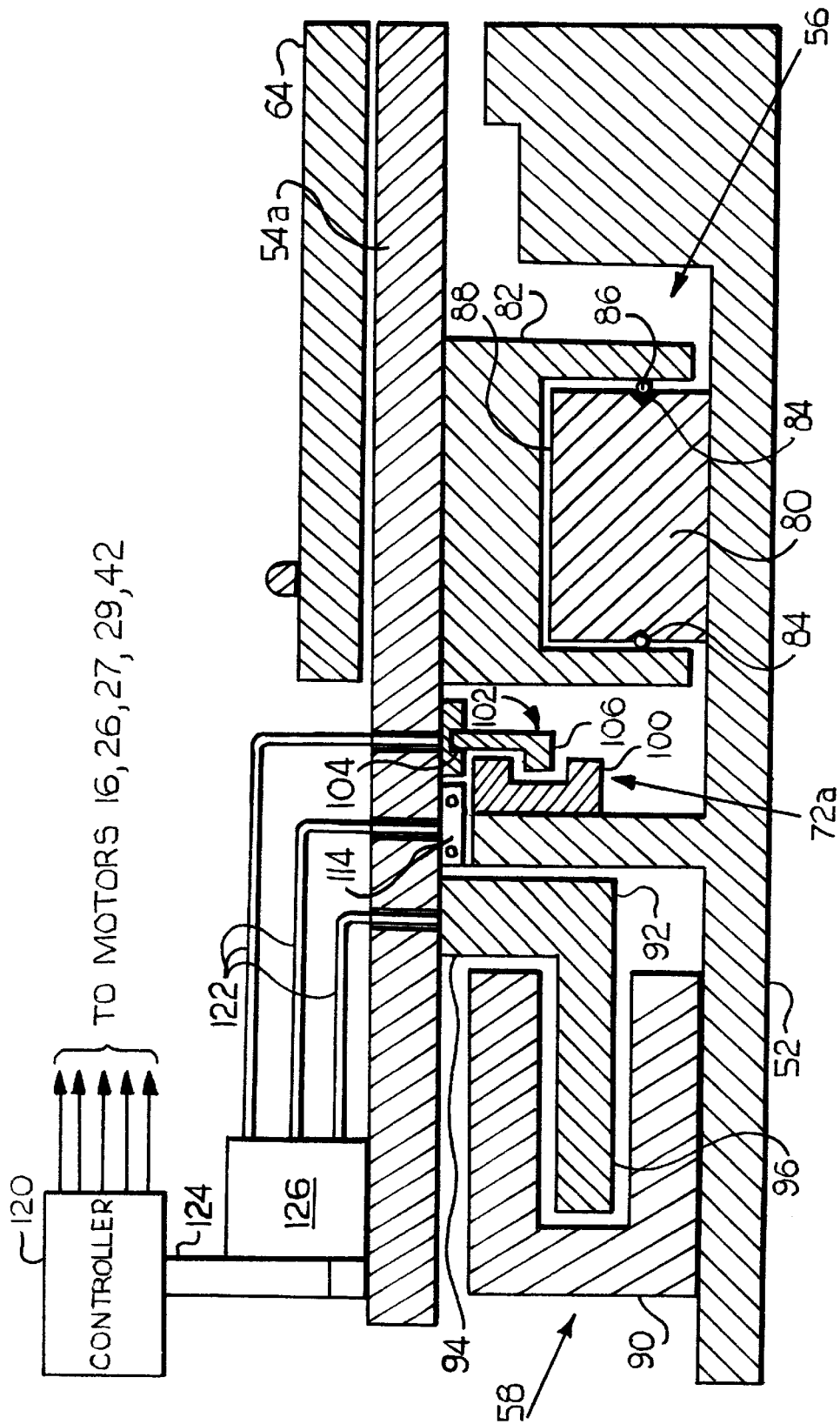
FIG. 4 is a section taken along the line IV—IV in FIG. 3.

With reference to FIG. 4, and with continuing reference to FIG. 3, the linear guide 56 includes a pair of elongated tracks 80 connected to the frame 52 and a pair of followers 82 coupled to the pair of tracks 80. A side of each base 54 opposite the length gauge 68 is connected to a side of one of the followers 82 opposite its corresponding track 80. The longitudinal axes of the tracks 80 are preferably aligned and positioned parallel to the longitudinal axis of the leg 36. The tracks 80 and the followers 82 are configured so that each follower 82 can move along the longitudinal axis of its corresponding track 80. Preferably, each track 80 has formed on opposite sides thereof a pair of V-shaped channels 84 that extend along the length thereof. Each follower 82 has a U-shaped channel 88 formed in a side thereof opposite the base 54. The U-shaped channel 88 of each follower 82 is configured to receive one of the tracks 80 so that opposing sides of the U-shaped channel 88 are in opposition with the V-shaped channels 84. Positioned between the opposing faces of the U-shaped channel 88 and the V-shaped channels 84 are bearings 86 that enable each follower 82 to move relative to its corresponding track 80.

The linear motor 58 includes an elongated stator 90 connected to the frame 52 and an armature 92 connected to the base 54 adjacent the stator 90. Preferably, the stator 90 is a fixed permanent magnet assembly and the armature 92 is electrically excitable. The longitudinal axis of the stator 90 is positioned parallel to the longitudinal axes of the tracks 80. Preferably, the stator 90 has a U-shaped cross section and the armature 92 has an L-shaped cross section which defines a base 94 and a leg 96. An end of the base 94 opposite the leg 96 is connected to a side of the base 54 opposite the length gauge 68 and the leg 96 is received between and in spaced relation to opposing faces of the stator 90.

Each linear encoder 72 includes an elongated scale tape 100 connected to the frame 52 and a scanning head 102 connected to the base 54 adjacent the scale tape 100. The longitudinal axes of the scale tapes 100 are positioned parallel to the longitudinal axis of the stator 90. Preferably, the scale tape 100 has a U-shaped cross section and the scanning head 102 has an L-shaped cross section which defines a base 104 and a leg 106. The end of the base 104 opposite the leg 106 is connected to a side of the base 54 opposite the length gauge 68 and the leg 106 is received between and in spaced relation to opposing faces of the scale tape 100.

Preferably, the linear guide 56 is a Model No. LW 35-0280-EL-1-P6-Z1, manufactured by NSK, Ltd of Tokyo, Japan; the linear motor 58 is a Model No. IL-06-050, MW 050-256, manufactured by Kollmorgen Motion Technologies Group of Commack, N.Y.; the linear encoder 72 is a Model No. LS 406-520 mm ML, manufactured by Heidenhain of Ruhr, Germany; and the length gauge 68 is a Model MT 12, manufactured by Heidenhain of Ruhr, Germany.

Connected between the frame 52 and the bases 54A and 54B are proximity sensors 110A and 110B. Proximity sensors 110A and 110B each include a pair of passive elements 112 connected to the frame 52 adjacent opposite ends of one of the tracks 80 and an active element 114 connected to the base 54 on a side thereof opposite the length gauge 68. The passive elements 112 and the active element 114 of each proximity sensor 110 are positioned on the frame 52 and the base 54, respectively, so that when the base 54 moves to either end of its track 80, the active element 114 connected to the base 54 contacts or moves into close proximity to one of the passive elements 112 and generates a signal indicative thereof.

The length gauge 68, the scanning head 102 and the active element 114 of each measuring arm 50 and the armature 92 of the linear motor 58 connected to measuring arm 50A are electrically connected to a controller 120 via conductors 122 that are received in flexible wiring harnesses 124. Each wiring harness 124 has one end secured to its corresponding base 54 via a terminal block 126. Preferably, the controller 120 is connected to motors 16, 26, 27, 29 and 42 to control the rotation of the grinding wheel 12, the position of the grinding wheel frame 14 on the base 4, the position of the roll support 6 on the base 4, the rotation of the roll 8 on the roll support 6 and the position of the caliper arm 32 adjacent or remote from the roll support 6, respectively.

In operation of the caliper 48, the controller 120 generates to the armature 92 of the linear motor 58 one or more signals which cause a motive force to develop between the armature 92 and the stator 90. This motive force causes the measuring arms 50A and 50B to move apart so that the roll 8 can be received between the probe tips 70. The controller 120 generates to the motor 42 one or more signals which cause the motor 42 to position the caliper arm 32 adjacent the roll support 6 with the probe tips 70 on opposite sides of the roll 8. Next, the controller 120 generates to the armature 92 of the linear motor 58 one or more signals which cause a motive force to develop between the armature 92 and the stator 90. This motive force causes the measuring arms 50A and 50B to move together toward the roll 8.

Movement of the measuring arms 50A and 50B relative to the frame 52 moves the scanning heads 102 of the linear encoders 72A and 72B relative to their respective scale tapes 100. In response to moving relative to the scale tapes 100, the scanning heads 102 generate to the controller 120 one or more signals indicative of the distance between the measuring arms 50 and, more particularly, the distance between the ends of the probe tips 70. When the end of each probe tip 70 contacts the roll 8, ongoing movement of the measuring arms 50A and 50B together causes each shaft 64 to undergo rotation around its pivot bearing 66. The extent each shaft 64 undergoes rotation is detected by the corresponding length gauge 68 which generates to the controller 120 a signal indicative of the rotation of the shaft 64 around the pivot bearing 66. At a suitable time after the ends of the probe tips 70 are in contact with the body of the roll 8, the controller terminates the one or more signals which cause the measuring arms 50A and 50B to move together and supplies to the armature 92 one or more signals which cause the armature 92 to bias the probe tips 70 in contact with the body of the roll 8. The controller 120 combines the signals generated by the length gauges 68 and the linear encoders 72A and 72B to obtain an indication of the diameter of the roll 8.

An advantage of using the linear motor 58 is that if one or both of measuring arms 50A and 50B experience a force, e.g., a rotational torque, in excess of a predetermined force, the armature 92 and the stator 90 of the linear motor 58 break or terminate magnetic alignment whereby no motive force is produced therebetween in response to excitation of the armature 92 by the controller 120. In response to this lack of motive force produced between the armature 92 and the stator 90 and in response to the force applied to one or both of measuring arms SA and 50B in excess of the predetermined force, one or both of measuring arms 50A and 50B rebound or move away from the roll 8 thereby avoiding potential damage to one or both of measuring arms 50A and 50B. For example, if the linear motor 58 moves the probe tip 70 of shaft 64 of measuring arm 50A into contact with the roll 8 with a force in excess of the predetermined force, the linear motor 58 terminates the motive force supplied to the base 54A. Since the bases 54A and 54B are coupled together by the cables 60 and the cable pulleys 62, terminating the motive force supplied to base 54A terminates the motive force supplied to base 54B.

The invention has been described with reference to the preferred embodiment. Obvious modifications and alterations will occur to others upon reading and understanding the preceding detailed description. For example, the roll support 6 can be stationary and the grinding wheel frame 14 and the frame 30 supporting the caliper arm 32 can be moved back and forth on the base 4, in the direction shown by the dashed two-headed arrow 130 in FIG. 1. Moreover, a second linear motor 58, shown in phantom in FIG. 3, can be utilized in the absence of the cables 60 and the cable pulleys 62 to supply motive force to the measuring arm 50 connected thereto. Furthermore, the cross-sectional shapes of the linear motor 58, the linear encoders 72 and the linear guides 56 are shown for illustration purposes only, and are not to be construed as limiting the invention. Lastly, in the above described embodiment, the stator 90 is a fixed permanent magnet assembly and the armature 92 is electrically excitable by the controller 120. Alternately, the armature 92 can be a permanent magnet assembly and the stator 90 can be electrically excitable by the controller 120. It is intended that the invention be construed as including all such modifications and alterations insofar as they come within the scope of the appended claims or the equivalents thereof.

We claim:

1. A grinding machine for grinding a roll, the grinding machine comprising:
   a roll support configured to receive a roll so that the roll is rotatable around its longitudinal axis;
   a grinding wheel having a grinding surface around the circumference thereof, with the grinding surface positionable in contact with the roll received on the roll support, with at least one of the grinding wheel and the roll support moveable relative to the other of the grinding wheel and the roll support so that the grinding surface is moveable between opposite ends of the roll;
   a caliper configured to measure a diameter of the roll, with at least one of the caliper and the roll support moveable relative to the other of the caliper and the roll support so that the caliper can measure the diameter of the roll between the opposite ends thereof, wherein the caliper comprises:
   a frame;
   a linear guide connected to the frame;
   a pair of measuring arms connected to the linear guide in spaced relation, with the linear guide configured to enable each measuring arm to simultaneously move relative to the linear guide and parallel to the longitudinal axis of the linear guide; and
   a linear motor connected between the frame and the pair of measuring arms, with the linear motor configured to supply to the pair of measuring arms a motive force which causes the pair of measuring arms to simultaneously move relative to the linear guide and parallel to the longitudinal axis of the linear guide, with the linear motor configured to terminate the supply of motive force to at least one of the measuring arms in response to the at least one measuring arm contacting the roll with a force in excess of a predetermined force.

2. The grinding machine as set forth in claim 1, wherein:
   the linear motor includes an elongated stator connected to the frame and a armature connected to at least one of the measuring arms, with the stator having a longitudinal axis positioned parallel to the longitudinal axis of the linear guide, and with the armature positioned adjacent the elongated stator and in spaced relation thereto; and at least one of the elongated stator and the armature is electrically excitable to develop therebetween the motive force.

3. The grinding machine as set forth in claim 2, further including a controller connected to and electrically exciting at least one of the stator and the armature to develop the motive force therebetween.

4. The grinding machine as set forth in claim 1, wherein the caliper includes a linear encoder connected between the frame and at least a first of the measuring arms, with the linear encoder configured to generate a signal indicative of the position of the first of the measuring arms on the frame.

5. The grinding machine as set forth in claim 4, wherein the linear encoder includes an elongated scale connected to the frame and a scanning head connected to the first of the measuring arms and in spaced relation to the elongated scale, with the longitudinal axis of the elongated scale positioned parallel to the longitudinal axis of the linear guide, and with the scanning head moving adjacent the elongated scale and generating the signal indicative of the position of the first of the measuring arms on the frame in response to movement of the first of the measuring arms relative to the frame.

6. The grinding machine as set forth in claim 1, wherein each measuring arm includes:
   a base connected between the linear motor and the linear guide;
   a shaft pivotally connected to the base and extending transverse to the longitudinal axis of the linear guide; and
   a length gauge connected between the base and the shaft, with the length gauge configured to generate a signal indicative of pivoting of the shaft relative to the base.

7. The grinding machine as set forth in claim 6, wherein the shaft is pivotally connected to the base intermediate the ends of the shaft and the length gauge is connected to the shaft adjacent one end thereof.

8. The grinding machine as set forth in claim 6, wherein the caliper includes a linear encoder connected between the frame and at least a first of the measuring arms, with the linear encoder configured to generate a signal indicative of the position of the first of the measuring arms on the frame.

9. The grinding machine as set forth in claim 8, further including a controller connected to receive and combine the signals from the linear encoder and the length gauges to obtain an indication of the distance between the shafts.

10. The grinding machine as set forth in claim 1, wherein the caliper includes:
    a pair of cable pulleys connected to the frame adjacent opposite ends of the linear guide; and
    a pair of cables, with one cable connected between the pair of measuring arms via one cable pulley and with the other cable connected between the pair of measuring arms via the other cable pulley.

11. A caliper assembly for measuring a diameter of a roll received on a roll support of a grinding machine, the caliper assembly comprising:
    a frame positioned adjacent the roll support;
    a linear guide connected to the frame, with the longitudinal axis of the linear guide positioned perpendicular and in spaced relation to the longitudinal axis of the roll received on the roll support;
    a linear motor connected to the frame, with the longitudinal axis of the linear motor positioned parallel to the longitudinal axis of the linear guide; and
    a first measuring arm connected between the linear guide and the linear motor, with the longitudinal axis of the first measuring arm extending orthogonal to the longitudinal axis of the roll and the longitudinal axis of the linear guide, wherein:
    the linear guide enables the first measuring arm to simultaneously move relative to the linear guide and parallel to the longitudinal axis of the linear guide;
    the linear motor supplies to the first measuring arm a motive force which causes the first measuring arm to simultaneously move relative to the linear guide and parallel to the longitudinal axis of the linear guide and into contact with the roll received on the roll support; and
    in response to the first measuring arm contacting the roll and the linear motor supplying to the first measuring arm a motive force in excess of a predetermined force, the linear motor terminates supplying the motive force thereto.

12. The caliper assembly as set forth in claim 11, further including:
    a second measuring arm connected to the linear guide;
    a first cable connected between the measuring arms via a first cable pulley positioned adjacent one end of the linear guide; and
    a second cable connected between the measuring arms via a second cable pulley positioned adjacent the other end of the linear guide wherein the cables, the cable pulleys and the measuring arms coact so that the linear motor supplying motive force to the first measuring arm causes the first and second measuring arms to synchronously move one of (i) together and (ii) apart.

13. The caliper assembly as set forth in claim 11, further including a linear encoder connected between the frame and the first measuring arm, with the linear encoder configured to generate a signal indicative of the position of the first measuring arm on the frame.

14. The caliper assembly as set forth in claim 13, wherein:
    the linear encoder includes a scale connected to the frame and a scanning head connected to the first measuring arm, with the longitudinal axis of the scale positioned parallel to the longitudinal axis of the linear guide, with the scanning head positioned adjacent the scale; and
    in response to movement of the first measuring arm relative to the frame, the scanning head moves adjacent the scale and generates the signal indicative of the position of the first measuring arm on the frame.

15. The caliper assembly as set forth in claim 11, wherein the linear motor includes:
    a stator connected to the frame, with the longitudinal axis of the stator positioned parallel to the longitudinal axis of the linear guide; and
    an armature connected to the first measuring arm and positioned adjacent the stator in spaced relation thereto, with at least one of the stator and the armature electrically excitable to develop therebetween the motive force.

16. The caliper assembly as set forth in claim 11, wherein the first measuring arm includes:
    a base connected between the linear guide and the linear motor;
    a shaft pivotally connected to the base, with the shaft positioned so that it extends transverse to the longitudinal axis of the linear guide; and
    a length gauge connected between the base and the shaft, with the length gauge configured to generate a signal indicative of pivoting of the shaft relative to the base.

17. A caliper assembly for measuring a workpiece, the caliper assembly comprising:
   a frame;
   a measuring arm;
   a linear motor connected between the frame and the measuring arm adjacent one end thereof; and
   a linear guide connected between the frame and the measuring arm adjacent the one end thereof, wherein:
      in response to excitation thereof, the linear motor generates a motive force which moves the measuring arm along the linear guide whereby the other end of the measuring arm moves one of (i) toward and (ii) away from the workpiece; and
      in response to moving the measuring arm adjacent the other end thereof into contact with the workpiece with a force in excess of a predetermined force, the linear motor terminates generating motive force.

18. The caliper assembly as set forth in claim 17, further including another measuring arm, with the linear motor and the linear guide connected between the other measuring arm and the frame, wherein the linear motor moves the measuring arms so that the other ends thereof move one of (i) together and (ii) apart.

19. The caliper assembly as set forth in claim 18, further including:
   one cable connected between the measuring arms via a cable pulley connected to the frame adjacent one end of the linear guide; and
   another cable connected between the measuring arms via another cable pulley connected to the frame adjacent the other end of the linear guide wherein, the cables, the cable pulleys and the measuring arms coact so that the linear motor synchronously moves the measuring arms.

* * * * *

UNITED STATES PATENT AND TRADEMARK OFFICE
CERTIFICATE OF CORRECTION

PATENT NO : 6,159,074
DATED : December 12, 2000
INVENTOR(S) : Samuel C. Kube et al.

It is certified that error appears in the above-identified patent and that said Letters Patent is hereby corrected as shown below:

Column 5, Line 15 "SOB" should read --50B--.

Column 7, Line 56 "SA" should ready --50A--.

Signed and Sealed this

First Day of May, 2001

Attest:

NICHOLAS P. GODICI

Attesting Officer     Acting Director of the United States Patent and Trademark Office